United States Patent [19]
David et al.

[11] Patent Number: 5,732,660
[45] Date of Patent: Mar. 31, 1998

[54] CONTROL COLLAR AND LEASH COMBINATION FOR DOGS

[75] Inventors: Nancy R. David, Carlsbad; John T. Doerr, Vista, both of Calif.

[73] Assignee: Reflex Corporation, Carlsbad, Calif.

[21] Appl. No.: 568,610

[22] Filed: Dec. 7, 1995

[51] Int. Cl.$^6$ .................................................. A01K 27/00
[52] U.S. Cl. ............................ 119/792; 119/831; 54/24
[58] Field of Search ........................... 119/831, 792, 119/834; 54/24

[56] References Cited

U.S. PATENT DOCUMENTS

| | | | |
|---|---|---|---|
| 179,898 | 7/1876 | Cronin | |
| 206,586 | 7/1878 | Leland | |
| 416,227 | 12/1889 | Lally | |
| 417,864 | 12/1889 | Gleiser | |
| 422,626 | 3/1890 | Pruyne | |
| 462,743 | 10/1891 | Sisson | |
| 660,494 | 10/1900 | Evans | |
| 904,321 | 11/1908 | Farrar | |
| 964,947 | 7/1910 | Varney | |
| 1,325,061 | 12/1919 | Veal | 54/24 |
| 2,499,868 | 3/1950 | Kinskie | 119/130 |
| 2,602,421 | 7/1952 | Barker | 119/130 |
| 2,625,780 | 1/1953 | Flatt | 54/6 |
| 2,672,846 | 3/1954 | Maynard | 119/130 |
| 2,932,930 | 4/1960 | Ray | 54/24 |
| 2,940,425 | 6/1960 | Dykens | 119/130 |
| 3,949,538 | 4/1976 | Woodruff | 54/24 |
| 4,337,610 | 7/1982 | Taylor | 54/24 |
| 4,369,615 | 1/1983 | Bloodworth | 54/24 |
| 4,472,925 | 9/1984 | Woodruff | 54/24 |
| 4,480,589 | 11/1984 | Schneider | 119/106 |
| 4,483,275 | 11/1984 | DeGroot | 119/130 |
| 4,566,255 | 1/1986 | DeGroot | 54/24 |
| 4,621,591 | 11/1986 | Anderson et al. | 119/130 |
| 4,741,288 | 5/1988 | Anderson et al. | 119/130 |
| 4,838,206 | 6/1989 | Anderson et al. | 119/130 |

FOREIGN PATENT DOCUMENTS

| | | |
|---|---|---|
| 72269 | 8/1916 | Austria |
| 117942 | 12/1926 | Switzerland |

*Primary Examiner*—John G. Weiss
*Assistant Examiner*—Bruce E. Snow
*Attorney, Agent, or Firm*—Lyon & Lyon LLP

[57] ABSTRACT

A combination collar and leash with built-in muzzle loop for use as a humane approach to controlling, restraining and achieving obedient behavior of animals, especially dogs. An adjustable collar loop encircles the neck of the animal at a comfortable position on the animal. A leash attaches to a ring secured to the collar. Built into the leash is a fully adjustable muzzle encircling loop. The muzzle encircling loop can be readily loosened or tightened, shortened or lengthened to accommodate different sizes and types of muzzles without interfering with the integrity and functioning of the leash. The muzzle encircling loop passes through a ring attached to the collar to form a control device which can be tightened down into a muzzle or left in a loosened position to be used as a humane control or restraining device to aid in achieving obedient or desired behavior. The leash can be used without the muzzle loop as a standard leash, or can be easily converted into a muzzle guidance system by employing the muzzle loop. The collar loop can be used without the leash as a standard collar, or can be combined with the leash and muzzle loop to form a humane aid for achieving obedient behavior of the animal.

22 Claims, 12 Drawing Sheets

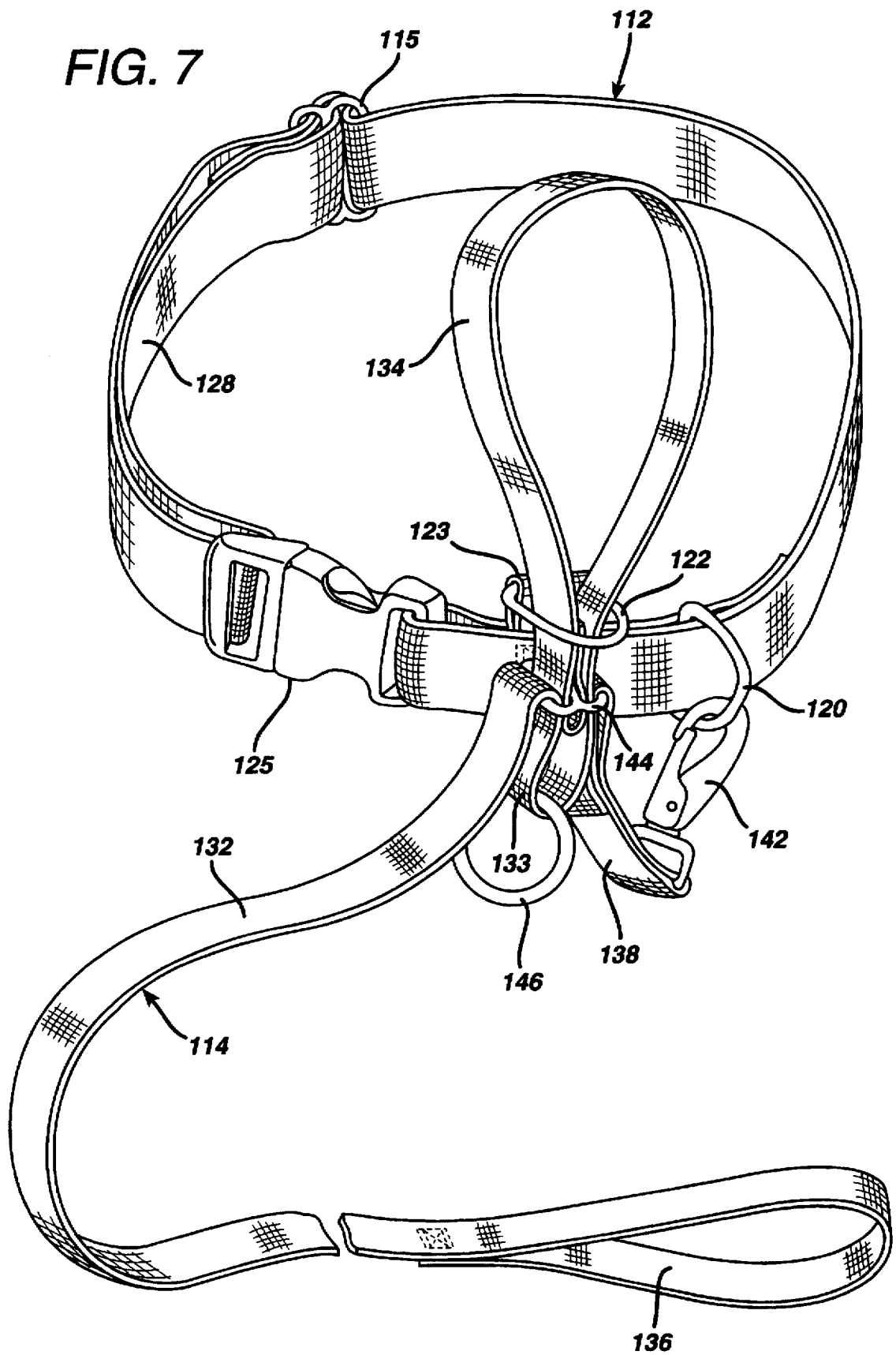

CONTROL COLLAR AND LEASH COMBINATION FOR DOGS

BACKGROUND OF THE INVENTION

The field of the present invention relates to training and behavior modification aids used for controlling and achieving obedient or desired behavior in animals, especially dogs. A variety of collar types have been used in an effort to achieve control of a dog. Choke collars, made from various materials, encircle the neck and when tightened down tend to actually choke a dog by applying pressure around the circumference of the neck, including the trachea and larynx. This pressure can potentially cause pain and possible injury as well as interfere with a dog's breathing. For stubborn dogs, dogs with a high pain tolerance level, or dogs with strong neck muscles, a choke collar can be relatively ineffective, especially if the collar has settled down onto the dog's strong neck muscles.

Pinch collars were devised to catch a dog's skin in various places around the neck and pinch it between metal pincers. Prong or spike collars function in a similar fashion. Prongs or points, usually metal, press against the neck skin. The harder the dog resists, the harder the dog is pinched or poked. These collars can be very painful and can damage the dog's skin.

The choke collar, the pinch collar, and the prong or spike collar all attempt to control a dog by inflicting discomfort, i.e. pain, and are often considered to be inhumane. The present inventor has recognized that a more humane and more effective approach involves maneuvering and controlling a part of a dog in such a way that also takes advantage of instinctive canine communication. This approach is muzzle control. Traditional muzzles such as U.S. Pat. No. 2,499,868 encircle or encase the upper and lower jaws of a dog to prevent the mouth from being opened sufficiently to bite, but these muzzle configurations are not particularly useful as aids in obedience training or in developing obedient behavior.

Various halters have been developed to assist in animal control. U.S. Pat. Nos. 660,494 and 904,321 disclose halters or bridles for horses, but those configurations are not readily adaptable to canines. U.S. Pat. Nos. 4,483,275 and 4,838,206 disclose training halters for canines, but those halters do not tend to be sufficiently adaptable in size or shape to properly accommodate the widely varied structure and size of the necks, heads and muzzles of the many dog breeds currently in existence. Moreover, these halters and muzzles do not provide the animal handler with muzzle guidance and control that is readily available on demand, but may also be used or not used as desired without interfering with the function, integrity and stability of the training and behavior modification aid.

SUMMARY OF THE INVENTION

The present invention in its preferred configuration is a combination collar and muzzle loop with, in certain embodiments, a detachable leash. The diameter of the collar is adjustable and has a leash ring and a muzzle loop ring attached to the collar. The control leash has a built-in muzzle loop on one end thereof. The muzzle loop is threaded through the collar ring and placed about the dog's muzzle. The combination may achieve obedient and desirable behavior of dogs by providing for the attachment of the control leash to the collar and for the insertion of the muzzle loop through the additional collar-attached ring and subsequently over the dog's muzzle. Together, the ring and the muzzle loop cause pressure to be applied against the exterior of the muzzle, or a tightening effect around the muzzle, when there is pulling on or against the control leash held by the dog handler.

The control leash is attached directly to the collar loop by means of the provided separate leash ring. The leash can be variable in length as long as its length is sufficient for the incorporation of a muzzle loop of adequate proportions to fit the muzzle of any dog breed. The control leash can be used with or without the employment of the muzzle loop.

The muzzle loop portion of the control leash is readily available and adjustable. It can be lengthened, shortened, loosened or tightened, without interfering with the functioning of the leash, to fit both the muzzle of the dog and the purpose of the animal's handler. The muzzle loop can be removed from the dog's muzzle without interfering with the leash attachment to the collar loop. Thus the animal handler, as desired or needed, can have greater control of the dog by employing the muzzle loop, or lesser control of the dog by using the control leash in a standard leash fashion. The muzzle loop can be adjusted and locked into any determined size, or length, by means of a sizing and locking device positioned on the leash. The larger the muzzle loop, the shorter the leash; the smaller the muzzle loop, the longer the leash. However, sizing the muzzle loop does not substantially change the length of the leash.

The collar loop and control leash are preferably made of materials that do not injure the skin. They are easily applied, with the control leash providing for the easy application and removal of the muzzle loop to allow for greater or lesser control of the dog depending upon the situation and the requirements of the handler.

BRIEF DESCRIPTION OF THE DRAWINGS

FIG. 7 illustrates an alternate embodiment for a leash and collar combination according to the present invention;

DETAILED DESCRIPTION OF THE PREFERRED EMBODIMENTS

The preferred embodiments of the present invention will now be described with reference to the drawings. To facilitate description, any identifying numeral representing an element in one figure will represent the same element in any other figure.

Figure 1:
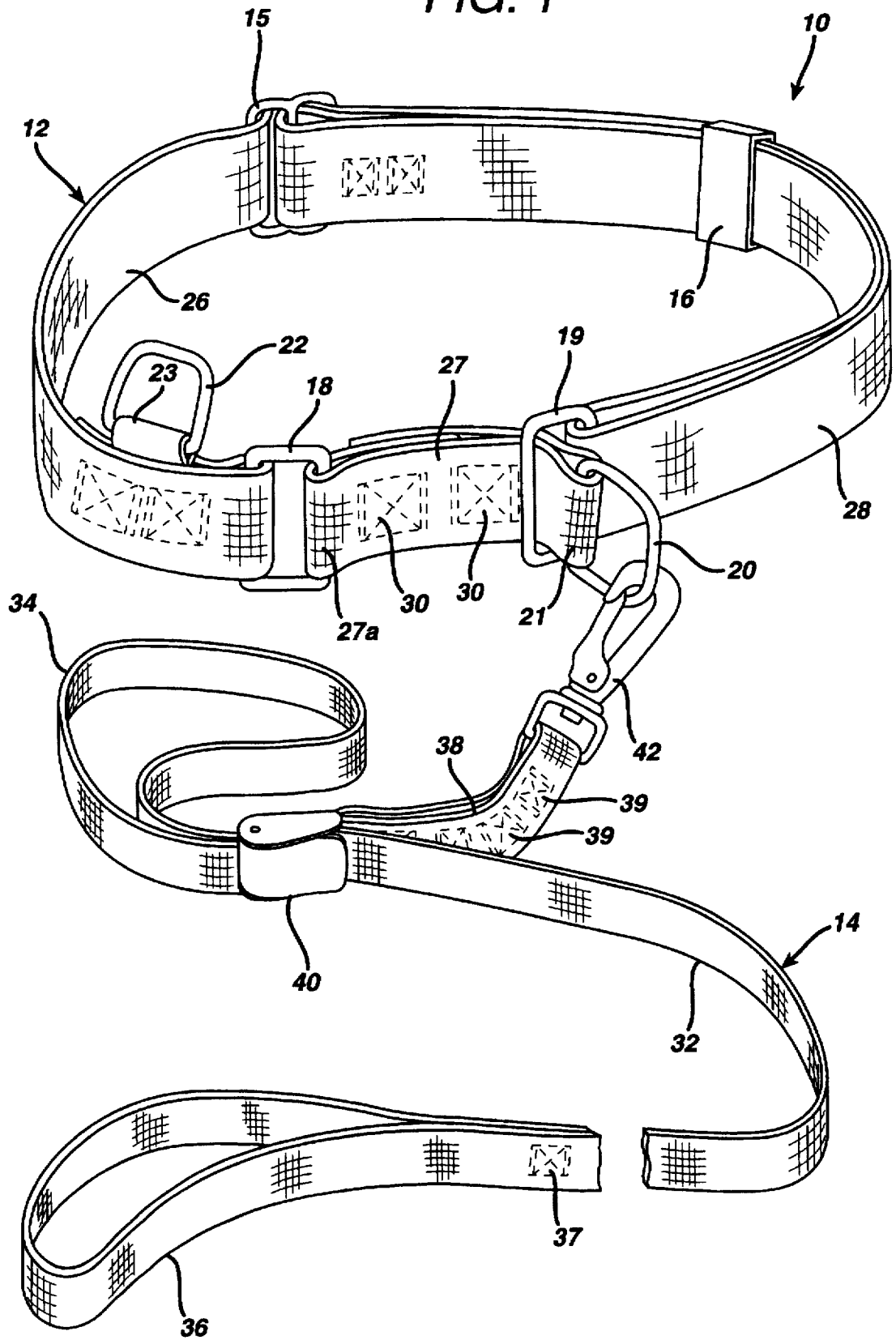
FIG. 1 is a perspective view of a combination collar and leash-muzzle training aid according to a preferred embodiment.
Figure 2:
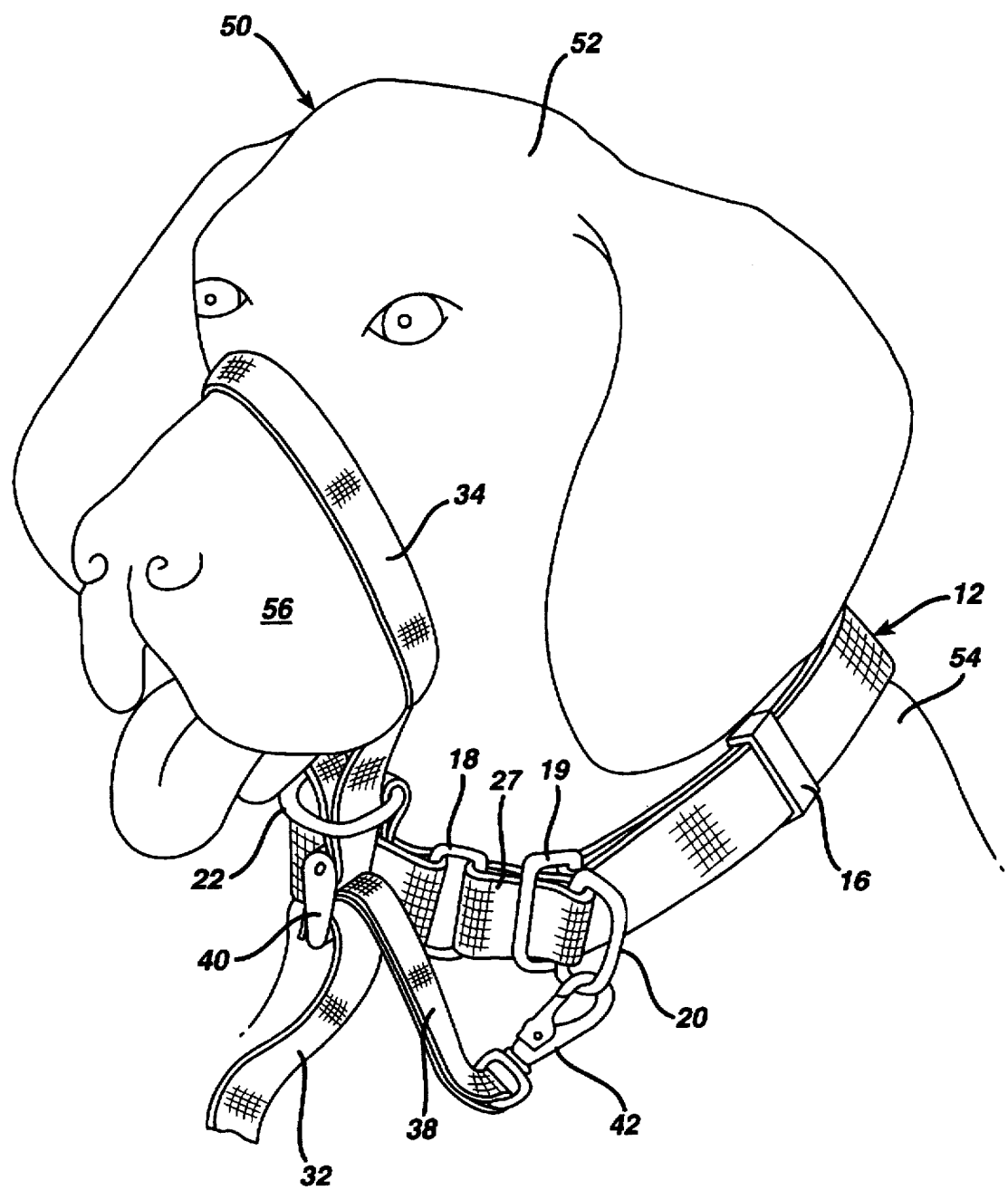
FIG. 2 illustrates the training aid of FIG. 1 positioned on the head of a dog, showing the muzzle loop of the training aid sized to the dog's muzzle but held loosely.
Figure 3:
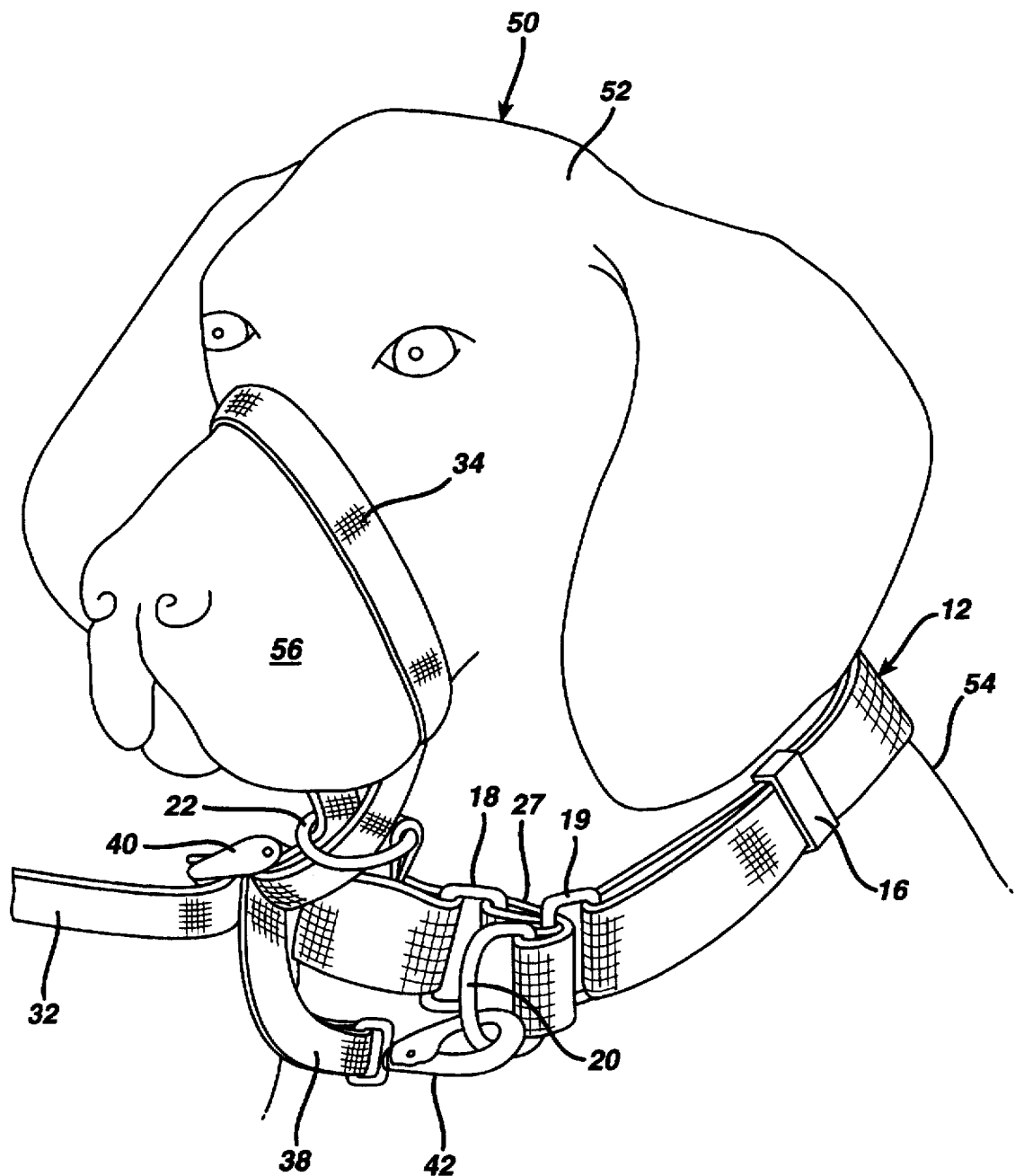
FIG. 3 illustrates the training aid as in FIG. 2 with the muzzle loop of the training aid in the process of being pulled more tightly about the dog's muzzle.

FIGS. 1–5 illustrate a first embodiment of a combination collar and leash-muzzle training aid shown generally as element numeral 10. FIG. 1 illustrates the components of the training aid 10. FIGS. 2 and 3 show the training aid 10 of FIG. 1 mounted on the head 52 and neck 54 of a dog 50.

The combination collar and leash-muzzle training aid 10 includes a collar loop portion 12, a muzzle loop 34 and a leash portion 14. The collar loop portion 12, muzzle loop 34 and leash portion 14 are preferably constructed from a strong flexible material such as nylon web, leather or the like. The collar portion 12 comprises a main section 26 comprising a single strap extending between connector ring 18 and tri-slide ring 15, and adjusting section 28 comprising two straps extending between the tri-slide ring 15 and the choke slide ring 19, and a tab section 27 extending from the connector ring 18 through the choke slide ring 19 to the leash clip ring 20. The ends of the tab section 27 loop around the leash ring 20 and the connector ring 18 and are secured by stitching 30, 30. The adjusting section 28 includes a means for adjusting size of the collar 12 comprising a tri-slide 15 which allows the collar 12 to be sized to securely and comfortably fit low on the dog's neck. Other suitable adjusting means such as a buckle or the like may be employed. A "keeper" device such as the collar clip 16 holds the collar material together. The collar portion 12 is placed on the dog by adjusting the size to be large enough to slip over the dog's head and then adjusting the size down to achieve a proper fit.

The leash ring 20 is of sufficiently large diameter such that it cannot be passed through the slide ring 19 to ensure the collar cannot inadvertently slip off the dog. When the collar portion 12 is properly sized, the extension tab 27 provides an extra length to the overall size of the collar 12 and serves as "comfort" length for the dog. The leash ring 20, attached to the free end of the extension tab 27, provides a convenient site for attachment of the leash 14 to the collar 12 by means of an attaching device such as the snap hook 42. When the ring 20 is pulled away from the collar loop 12 (such as by pulling on the leash 14), the extension tab 27 slides freely through the opening of the ring 19, temporarily diminishing the overall size of the collar loop 12. When the ring 18 is pulled up against the ring 19, the overall size of the collar 12 cannot be further reduced since the connector ring 18 is of sufficiently large diameter such that it cannot be passed through the slide ring 19. In its preferred form, the collar 12 has a modified choke which allows the collar to be tightened down by pulling on the leash 14, but the amount of tightening is limited by the length of the tab section 27. As the leash is pulled, the length (circumference) of the collar 12 is reduced (until stopped by the ring 18 contacting slide ring 19) tightening on the dog's neck. When properly sized, the collar 12 in its reduced form will not choke the dog's neck, but merely provide a secure force and extra control when needed. When the pulling on the ring 20 is discontinued, the extension tab 27 can slide freely back through the opening of the ring 19, stopping when the ring 20 contacts the slide ring 19.

The length of the tab 27 is chosen for the particular size and breed of dog. The length of the tab 27 for the size of this "modified" choke collar is about 2" (5 cm) for larger breeds and about 1" (2.5 cm) for smaller breeds. Pulling on the ring 20 thus causes the overall size of the collar 12 to be temporarily diminished (by an amount up to about the length of the tab 27) with ring 18 serving as a safety stop device to limit the size reduction. When the collar is properly sized, pulling on the leash ring 20 also prevents the collar 12 from sliding over the dog's head when the muzzle loop 34 is not being used. The configuration allows for a comfortable fit for the dog when the leash 14 is not attached (or attached and not being pulled upon) and for a firm fit when needed. The combination of the collar sections 26, 28, the extension tab 27 and the rings 18, 19 and 20 forms a continuous loop without closure devices such as a buckle.

In its preferred configuration, the leash portion 14 is comprised of (a) a first end having the snap hook 42 attached for allowing detachable connection to the leash ring 20 of the collar 12, (b) a muzzle loop 34 adjacent the first end which is threadable through the muzzle ring 22 of the collar 12 and outwardly extendable therefrom for encircling the dog's muzzle 56, (c) a main leash section 32 of desired length, and (d) a handle portion 36 on the second end comprised of a single loop of the strap secured by stitching 37, and (d) a locking device such as the cam buckle 40 for sizing the muzzle loop 34 to fit the dog's muzzle.

Figure 5:
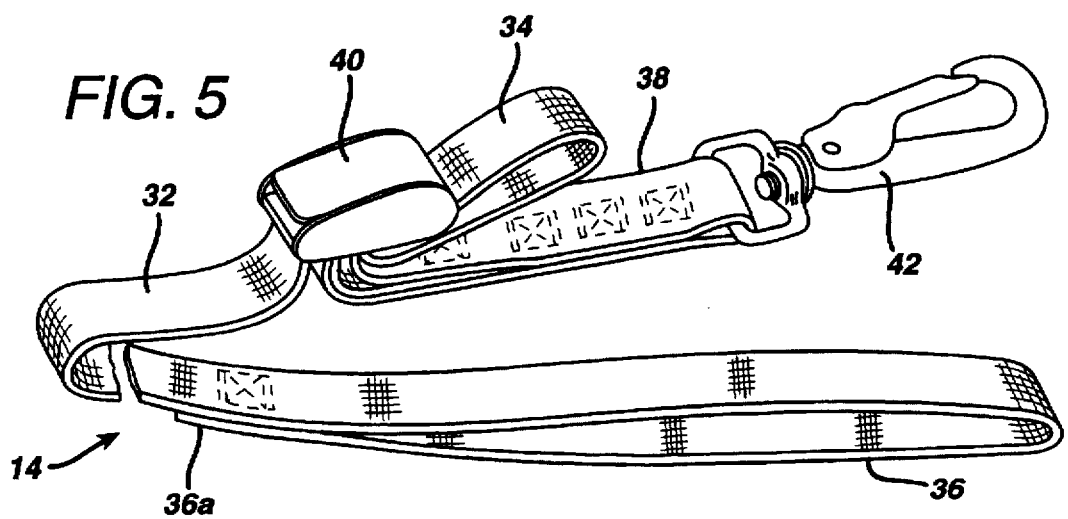
FIG. 5 is a detailed view of the leash and muzzle loop portion illustrating the muzzle loop being diminished into the leash.
Figure 5A:
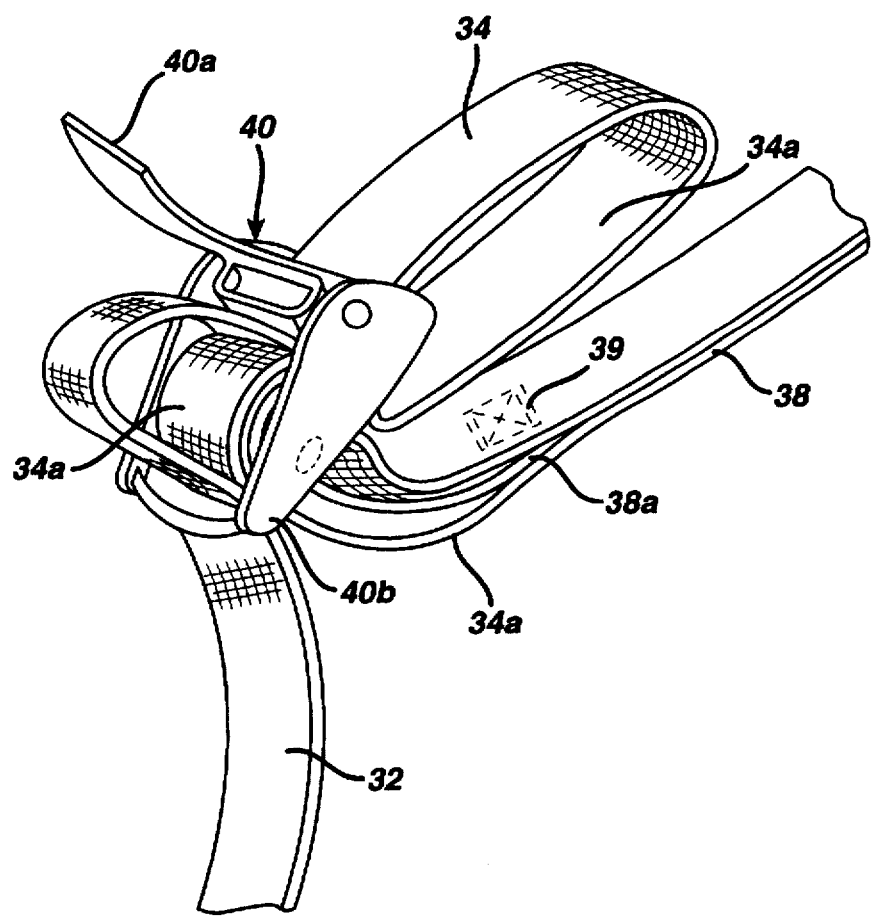
FIG. 5a is a detailed perspective view of the cam buckle of FIG. 5 illustrating the adjustability of the muzzle loop on the leash portion and the threading of the leash material through the cam buckle.

FIG. 5A illustrates details of the cam buckle 40 of FIG. 5. The cam buckle 40 includes a body 40b and a release handle 40a, and a front mouth and two bottom slots (front and rear) for passing the strap sections. The strap sections are threaded through the cam buckle 40 as follows: the top of the muzzle loop 34 passes through the buckle mouth and then out through the rear bottom slot. Moving the handle from the locked position (as shown in FIG. 5) to the unlocked position (as shown in FIG. 5A) permits strap to be fed through the buckle enlarging or reducing the size of the muzzle loop. The bottom portion (shown as 34a) of the muzzle loop 34 passes through the front bottom slot into the buckle body 40b and then exits out the rear bottom slot, wraps around the leash clip 42 and then returns to feed again through the front bottom slot into the buckle body 40b and then exits out the rear bottom slot with the strap section 38 all secured together by stitching 39. In this configuration, the leash 14 is made from a single continuous strap piece, preferably nylon web, from the handle end 36a (see FIG. 5) to the collar end 38a (see FIG. 5A). Because of the multiple passes of strap through it, the cam buckle 40 may have to be modified from the standard off-the-shelf item to accommodate the added thickness of multiple strap passes. A suitable manufacturer would be able to modify its standard design, if necessary, by for example providing larger bottom slot openings and additional clearance below the handle 40a.

When muzzle control is needed, the dog handler need only insert the muzzle loop 34 portion of the leash 14 upwardly through D-ring 22 attached to a top edge of the collar 12 and over the dog's muzzle as shown in FIG. 2. The muzzle loop 34 slides freely through the opening of the ring 22. The addition of the muzzle loop 34 transforms the collar portion 12 into an effective training aid. The dog handler can readily size the muzzle loop 34 by unlocking the cam buckle 40, feeding additional length of strap through the buckle and then locking the buckle.

Though the muzzle ring 22 is preferably attached to the top edge of the collar 12, to be in the most convenient location adjacent the dog's muzzle, the ring 22 may be alternately attached to the bottom edge of the collar or the center thereof. It is also preferred that the muzzle ring 22 be oriented with its attached end parallel to the collar 12 so the muzzle loop 34 may proceed directly upward through the ring 22 and around the muzzle 56. The pivoting action of the muzzle ring 22 away from the dog's neck 54 enhances comfort and effectiveness.

When the device such as the cam buckle 40 is unlocked, the muzzle loop 34 can be shortened by pulling on the leash 14 (to reduce the size) or lengthened by pulling on the muzzle loop 34 (to increase the size). As shown for example in FIG. 5, the muzzle loop 34 can be completely diminished into the leash 14, if so desired, by unlocking the cam buckle 40 and pulling the entire length of the loop through the buckle. Because of the manner in which the material is fed through the cam buckle 40, the material is readily accessible and can be pulled up through the cam buckle 40 in order to re-form the muzzle loop 34. The cam buckle 40 is preferably of sufficiently large size such that it cannot pass through the ring 22 (and therefore remains below it) after the muzzle loop 34 has been passed up through the ring 22, in order to control the position and maneuverability of the dog's muzzle.

The length of the first end piece 38 of the leash 14 between the snap hook 42 and the cam buckle 40 is determined by the size of the dog—approximately 4 inches (10 cm) with four rows of stitching 39 for larger dogs or approximately 2 inches (5 cm) with two rows of stitching 39 for small dogs. The length of the end piece 38 between the leash attaching snap hook 42 and the cam buckle 40 provides for maneuverability of the muzzle loop 34 when it is placed around the muzzle of the dog without losing leash integrity. The end piece 38 also provides for a backup attachment to the collar loop 12 should the muzzle loop 34 come off of the dog's muzzle, and for the primary attachment of the leash 14 when it is used in standard leash style.

On installation, the collar loop 12 is slipped over the head 52 of the dog 50 and brought to rest at a comfortable position low on the neck 54 approaching the shoulders (as opposed to locating the collar high on the head behind the ears). The sizing is adjusted by means of an adjusting device such as the tri-slide ring 15. The collar 12, muzzle loop 34 and leash 14 strap components are preferably made of a strong nylon webbing material, but can be made of other flexible materials such as leather or other strong fabrics. The collar loop 12 is sized to fit reasonably closely around the neck 54, when the extension tab 27 is fully extended by pulling on the ring 20 until the ring 18 rests against the slide ring 19. When the ring 20 is released, the extension tab 27 can slide back through the ring 19 until the ring 20 rests against the ring 19, enlarging the collar loop 12, thus providing a "comfort" length in the sizing of the collar loop 12. The ability to temporarily downsize the circumference of the collar loop 12 by pulling on the ring 20 provides a safety feature to prevent the collar loop 12 from sliding over the head 52, and thus off of the dog, when the muzzle loop 34 is not in use and the leash 14 is being used only in a "standard" leash mode. In the muzzle mode, pulling on the leash will also apply some tightening effect on the collar loop 12.

FIG. 2 illustrates the muzzle loop 34 sized to comfortably fit the muzzle 56 of the dog 50. If additional control is required, the muzzle loop may be cinched down by pulling on the leash 32 as shown in FIG. 3 thereby tightening the muzzle loop 34 about the dog's muzzle 56.

Figure 4:
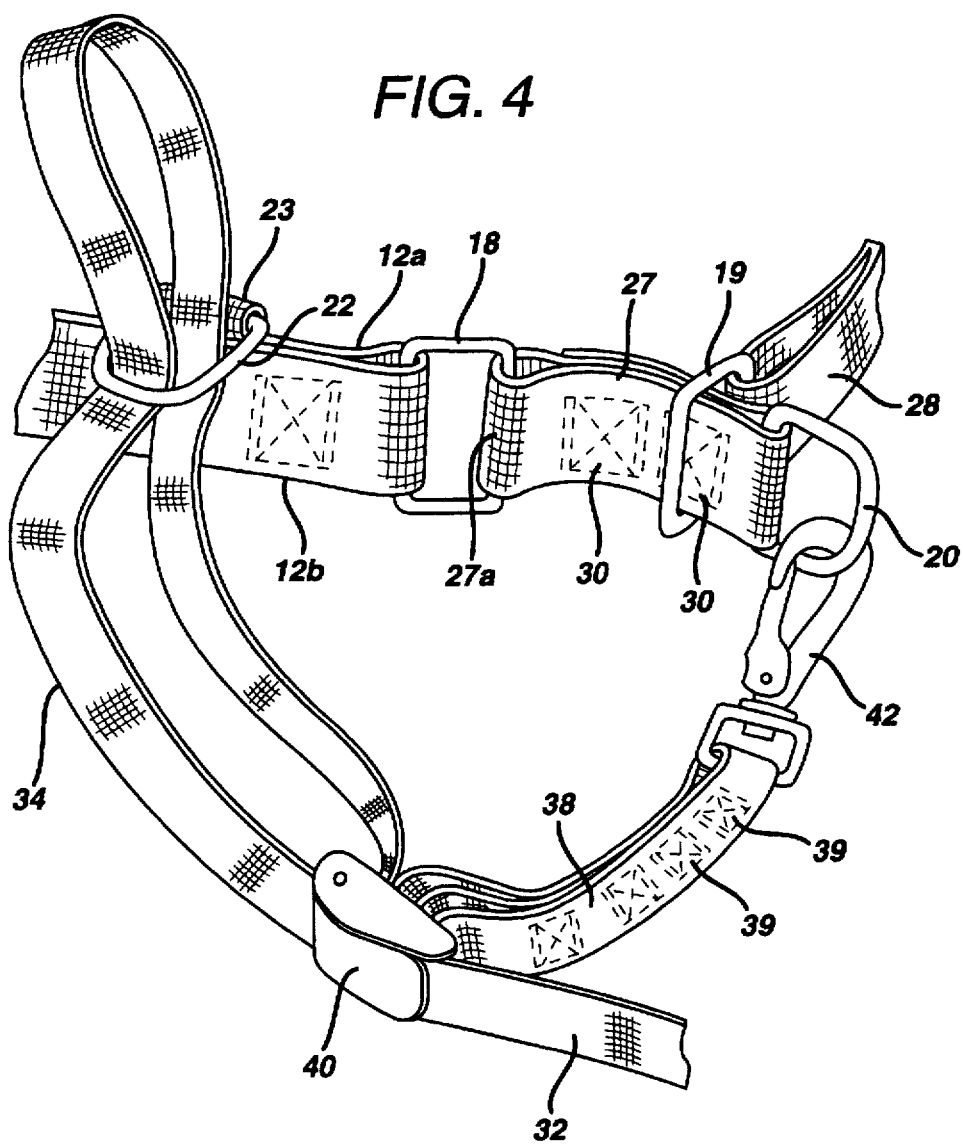
FIG. 4 is a detailed view of a portion of the training aid of FIG. 1 illustrating the attachment of the leash to the collar and the insertion of the muzzle loop through the collar ring.

In order to clearly describe the relative positioning and orientation of the elements of the dog collar and leash combination, certain relative directions will now be defined. Parallel to the collar is defined as a direction tangential to (i.e. along the circumference of) the collar and parallel to a plane of the collar. Approximating the collar as a circular object, the plane of the collar would be defined as a plane passing through the entire collar, generally perpendicular to a longitudinal axis of the dog's neck. Perpendicular to the collar is defined as a direction tangential to (i.e. along the circumference of) the collar and arranged perpendicular to the plane of the collar. Therefore referring to FIG. 1, the straight side of muzzle D-ring 22 is located parallel to the collar 12 and the straight side of the leash D-ring 20 is positioned perpendicular to the collar 12. The upper side or upper edge of the collar 12 is defined as that edge of the collar which would be closer to the dog's head. For example, as shown in FIG. 4, the muzzle D-ring 22 is secured by a loop strap section 23 at the top edge 12a of the collar 12 as opposed to the bottom edge 12b. As such the muzzle ring 22 is pivotally attached in a position at a top edge of the collar portion 12 parallel to the collar portion 12, with the leash ring 20 pivotally attached to the collar portion 12 perpendicularly thereto.

Various alternative structures may be employed. For example, the connector ring 18 may be eliminated in which case the muzzle ring 22 would then also function as the choke stop against the slide ring 19. The length of the tab section 27 would then extend from the leash ring 20 to the muzzle ring 22 with its overall length sized accordingly as previously described.

Another alternate design would be to eliminate the muzzle ring 22 and use the connector ring 18 instead. The muzzle loop would then be threaded through the connector ring 18. In another alternate arrangement, the functions of the rings 18, 19 may be reversed. In such a configuration, the tab section 27 would be threaded through the opening in the ring 18 with the collar connection end 27a (see FIG. 4) attached to the ring 19. The ring 18 then becomes a slide ring through which the tab section 27 passes. The version illustrated in FIG. 4 is nonetheless preferred because the muzzle ring 22 is separated from the leash ring 20 to allow elements to be more easily manipulated by the handler. In the reversed configuration described in this paragraph, the muzzle ring 18 and the leash ring 22 would be located adjacent each other which may be preferred by certain handlers for certain breeds.

Figure 6:
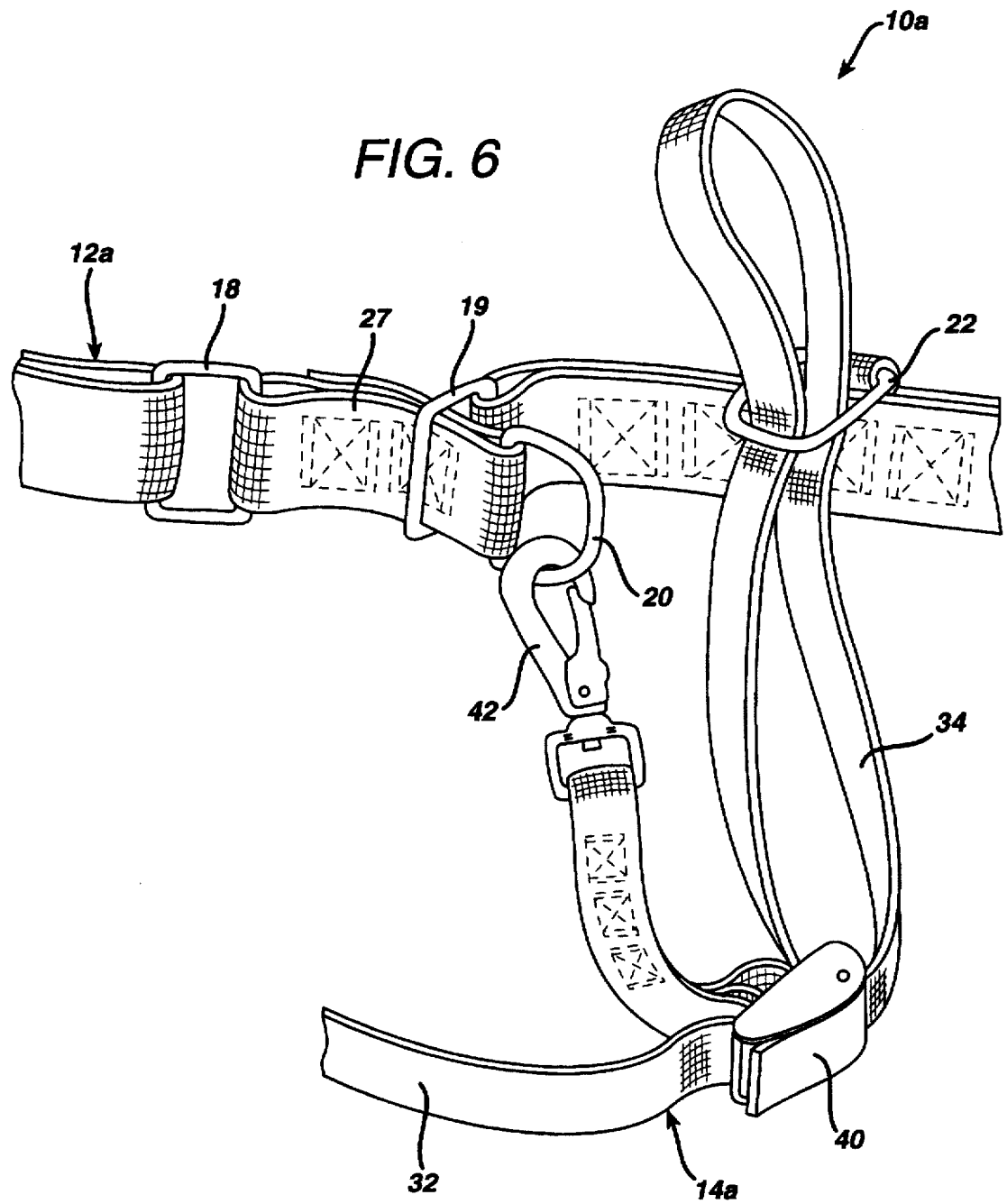
FIG. 6 is a detailed view of an alternate collar configuration including the modified choke feature.

Relative locations of certain components may also be rearranged. FIG. 6 illustrates an alternate collar and muzzle-leash combination 10a embodiment having all the components with the same element numerals as in the combination of FIG. 4. The only difference between the embodiments of FIGS. 4 and 6 is that in the collar portion of FIG. 6 (designated by element numeral 12a), the muzzle ring 22 is positioned adjacent to and to the right of the slide ring 19 as opposed to being adjacent to and to the left of the connector ring 18 as in FIG. 4. The leash portion (designated by element numeral 14a) is identical to the leash portion 14 of FIG. 1.

As described herein, with the muzzle loop 34 in place on the dog's muzzle 56, pulling on the leash 32 (as shown in FIG. 3) pulls the muzzle loop 34 downward through the muzzle ring 22 to achieve stronger control of the animal. Mere pulling of the muzzle loop 34 downward through the muzzle ring 22 does not reduce the size of the muzzle loop 34 because when tension on the leash 32 is released, the muzzle loop 34 can return to its "comfort" state as shown in FIG. 2. The size of the muzzle loop 34 is adjusted by means of the cam buckle 40 or other suitable locking device such as a clamp buckle or tri-slide ring. Once adjusted with the cam buckle 40 in the locked position, the size of the muzzle loop 34 is fixed independent of the tension (or no tension) applied by the leash 32.

Figure 6A:
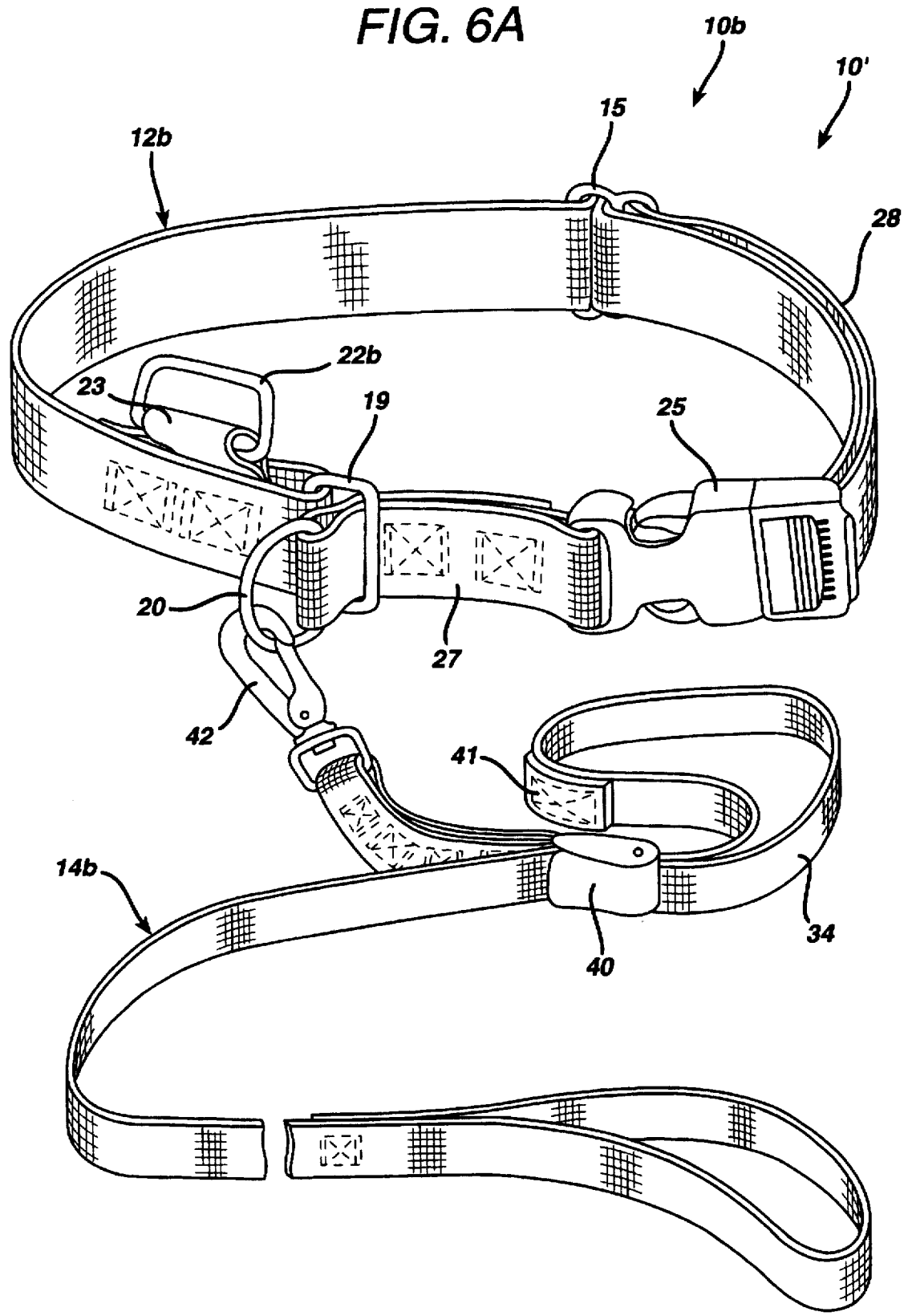
FIG. 6A is a detailed view of another alternate collar configuration including the modified choke feature.

The collar itself may be provided with a separate release mechanism such as a releasable locking device to facilitate its removal and installation. For example FIG. 6A illustrates a modified version of the combination of FIG. 6. The combination leash/collar 10b of FIG. 6A includes one example of a releasable locking device, namely the TUFF LOCK™ device 25. The TUFF LOCK™ device 25 is a releasable buckle which facilitates installation and removal of the collar portion 12b from the neck of the dog. When properly sized by adjusting the overlap section 28 through the tri-slide ring 15, the collar portion 12b fits closely around the neck of the dog when the leash ring 20 is pulled tightly causing the buckle 25 to butt up against the slide ring 19. When pulling on the leash ring 20 is released, the extension tab section 27 slides freely back through the choke slide ring 19, causing the leash ring 20 to rest against the slide ring 19, and returning the collar 12b to the "comfort" (i.e. large diameter) state for the dog.

The collar portion 12b also illustrates the slide ring 19 as being adjacent the muzzle ring 22b (as opposed to the arrangement of FIG. 4) which may be preferred by certain handlers for certain breeds or by personal preference.

The collar section 12b also includes a rectangular or square-shaped muzzle ring 22b attached to the collar by a fabric loop 23. The key rings to this device are the muzzle ring 22b and the leash ring 20. By employing rings of different shapes, i.e. a rounded or D-shaped ring for the leash ring 20 (for attachment of the leash clip 42) and a square or rectangular shaped ring for the muzzle ring 22b (for insertion of the muzzle loop 34), possible confusion over attachment and use of the device is reduced. Different color rings may also be employed such as a silver ring for the leash ring 20 and a black ring for the muzzle loop 22b.

The leash portion 14b is also provided with a slide stop 41 on the muzzle loop 34. The slide stop 41 may be made of the same material as the leash fabric, or some other preferably flexible material. The slide stop 41 may be made by folding a portion of the muzzle loop 34 fabric over on itself and secured (e.g. stitched) in place. The slide stop 41 is positioned in such a manner that it prevents the muzzle loop 34 from sliding completely through when the cam buckle 40 is unlocked and the leash 14b is pulled through the cam buckle 40 to diminish the size of the muzzle loop 34. Preventing the muzzle loop 34 from being completely diminished into the leash 14 facilitates re-forming the muzzle loop 34 to employ the muzzle control function. If desired, the stop pads 41 may be utilized on other embodiments.

Figure 8:
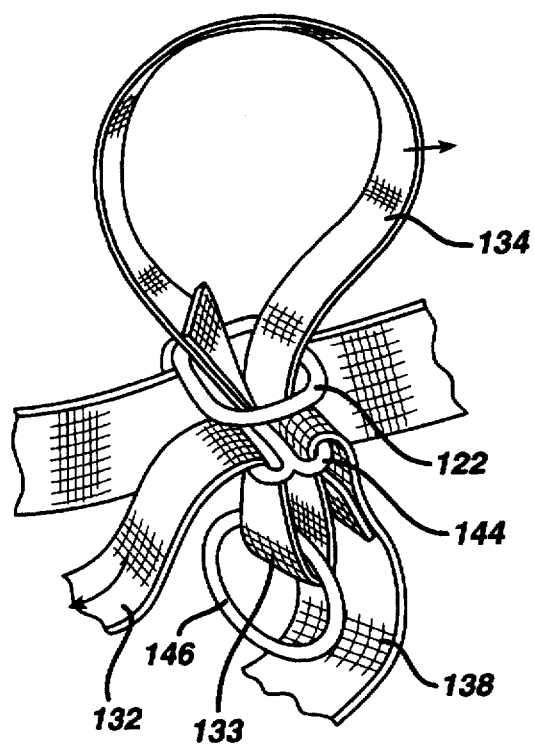
FIGS. 8–9 are partial views of the embodiment of FIG. 7 illustrating operation of the leash and collar combination.
Figure 9:
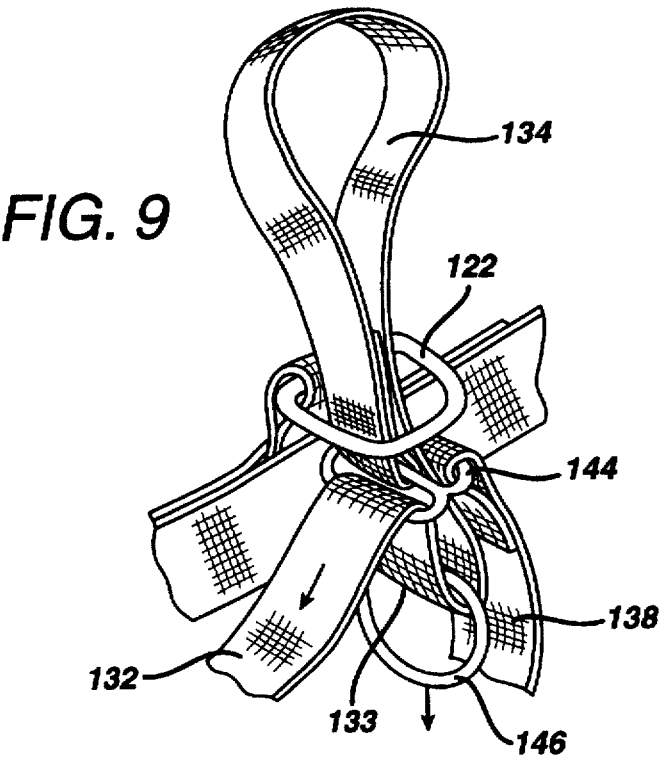

FIGS. 7–9 illustrate an alternate collar design and an alternate leash-muzzle design. The size of the collar 112 is adjustable by operation of the tri-slide ring 115 overlapping more or less strap in the adjustment section 128. The collar 112 is readily installed or removed from the dog's neck by the releasable TUFF LOCK™ buckle 125. Once the fit of the collar 112 is adjusted, its size remains the same (i.e., there is no modified choke feature as to this embodiment). The muzzle D-ring 122 is attached by a strap portion 123 to the top edge of the collar 112.

The leash portion 14 with muzzle loop 34 of the embodiment of FIG. 1 may be used with the collar 112 of this figure. FIG. 7 also illustrates a leash portion 114 of alternate design.

The leash portion 114 may be employed with the collar 12 of FIG. 1. The leash portion 114 is comprised of leash strap 132, leash handle 136, muzzle loop 134 which is threadable through the muzzle ring 122, end piece 138, and connector 142 (illustrated as a press clip) which is detachably attachable to the leash ring 120.

The separate leash ring 120 facilitates access for attaching the leash clip 142, but the leash ring 120 may be omitted and the clip 142 merely attached to the muzzle ring 122.

The only difference between the leash portion 114 of FIG. 7 and the previously described leash portion 14 of FIG. 1 is the adjustment means for adjusting the size of the muzzle loop. While the leash portion of FIG. 1 employs the cam buckle 40, the leash portion 114 of FIG. 7 employs a tri-slide 144 positioned on the leash side of the muzzle ring 122 through which the leash strap 132 threads. The tri-slide 144 and the grip ring 146 work together in a clamping action against the strap material of the muzzle loop 134 and leash 132 allowing for adjustment of the muzzle loop 134 to a desired size and, once adjusted, for locking it to that size when tension is applied to the muzzle loop 134 and/or the leash 132. As best viewed in the details of FIGS. 8–9, a grip ring 146 is provided to facilitate pulling the strap through the tri-slide 144 to adjust the size of the muzzle loop 134. If the handler needs to increase the size of the muzzle loop 134 secured around the dog's muzzle, the handler needs to only pull on the grip ring 146 (which increases the size of the strap loop 133 under the tri-slide 144), then pull up or out on the muzzle loop 134 around the dog's nose (i.e. its muzzle) until the desired size of the muzzle loop 134 is attained. The slack in the loop 133 may then be removed by pulling on the leash 132 thus setting the grip ring 146 against the strap material and the tri-slide ring 144 locking the muzzle loop size. To reduce the size of the muzzle loop 134, the handler need pull on the grip ring 146 (which releases the pressure caused by the grip ring 146 and increases the size of the strap loop 133) thus "unlocking" the sizing of the muzzle loop 134, while pulling on the leash 132 which causes the material of the muzzle loop 134 to slide downward through the tri-slide 144 reducing the size of the muzzle loop 134.

As in previous embodiments, when the muzzle loop 134 is not needed, the leash 114 remains secured to the leash ring 120 of the collar by attachment of the snap ring 142 to the leash ring 120. The muzzle loop 134 may also be completely diminished into the leash 132 by removing the muzzle loop 134 from the dog's nose and pulling on the leash 132. The muzzle loop 134 is made readily accessible by pulling on grip ring 146 and releasing the pressure against the strap material, thus allowing the muzzle loop 134 to be reformed by pulling the strap material upward through the tri-slide 144.

Figure 10:
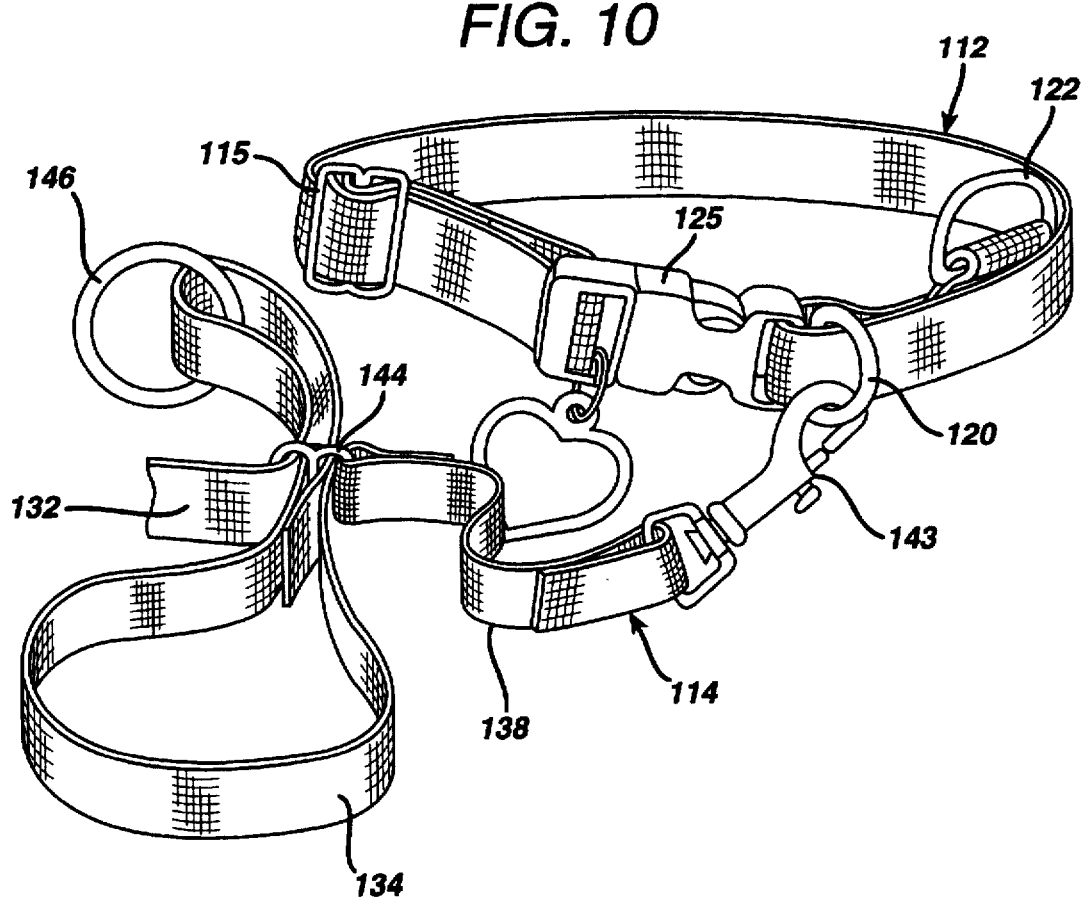
FIG. 10 illustrates an alternate configuration for the leash and collar combination of FIGS. 7–9.
Figure 11:
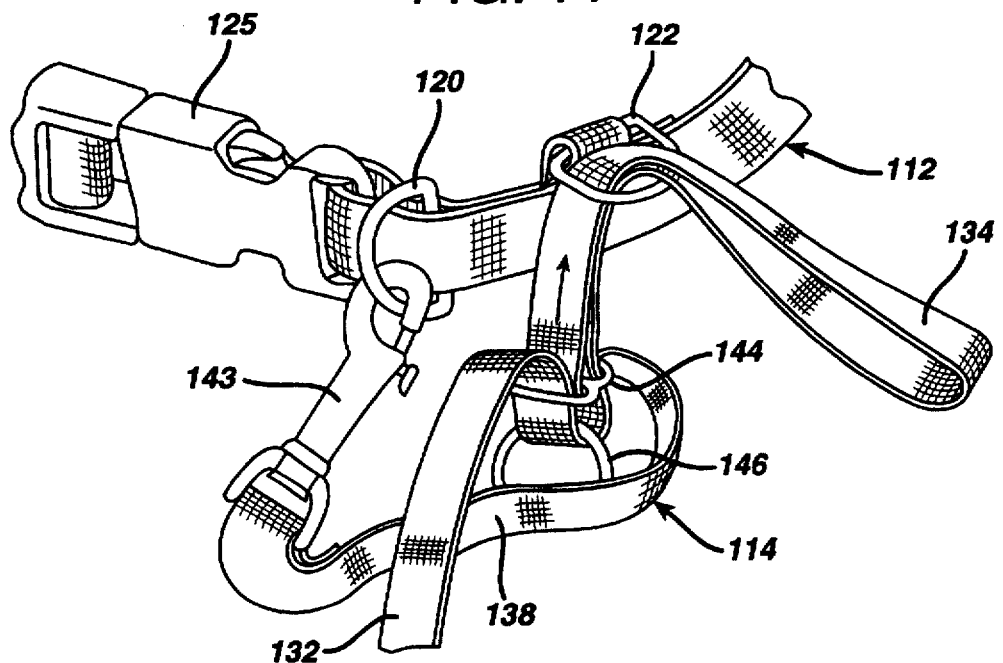
FIG. 11 is a partial view of the leash and collar combination of FIG. 10 illustrating the operation thereof.

The configuration of the components in the leash and collar combination 110 of FIGS. 7–9 may also be modified. FIGS. 10–11 illustrate a slightly modified configuration in which the leash ring 120 is located between the collar buckle 125 and the muzzle ring 122. FIGS. 10–11 also illustrate a different style leash connector, shown as a spring clip connector 143 in place of the squeeze-type snap connector 42 (FIGS. 1–5) or 142 (FIG. 7). The remaining elements of FIGS. 10–11 are as in the previous embodiment and therefore their descriptions are not repeated.

Figure 12:
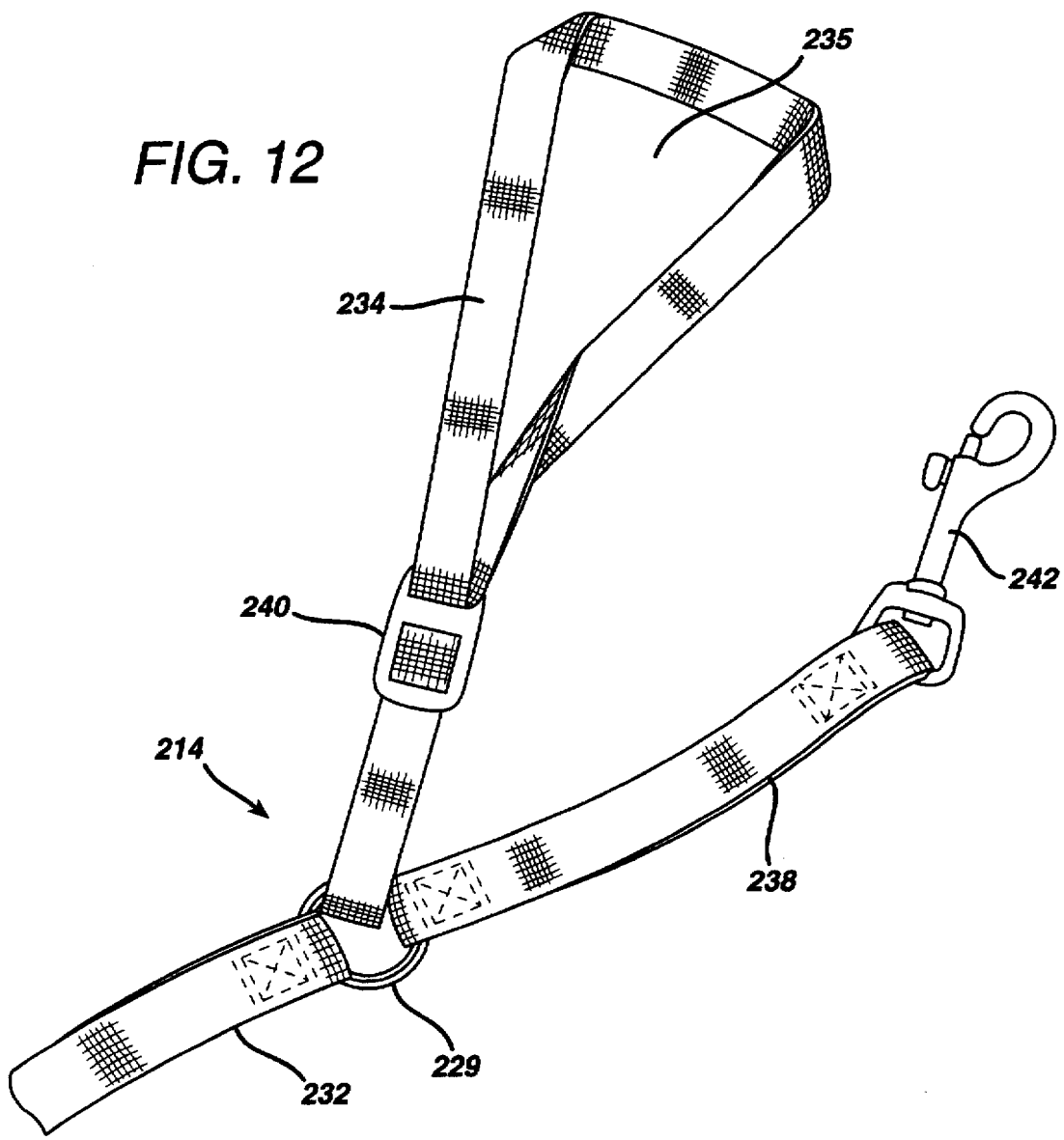
FIG. 12 is a perspective view of another alternate leash and muzzle loop combination.
Figure 12A:
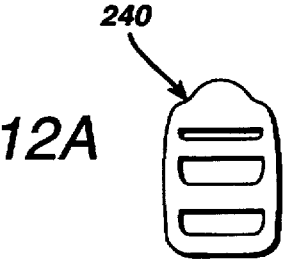
FIG. 12A is a detailed view of the ladder clip of FIG. 12.

FIGS. 12–12A illustrate another alternate embodiment which is a simplified leash combination 214 comprised of a leash section 232 with a handle (not shown) attached on one end and a connector ring 229 attached on the other end. The leash combination 214 shown in FIG. 12 also includes a tab section 238 which is attached on one end to the connector ring 229 and on the other end to the leash clip 242. The muzzle loop 234, comprised preferably of a continuous loop, has one end looped around the connector ring 229. The muzzle loop 234 may be passed through the muzzle ring of the collar of any of the previous embodiments and placed around the dog's nose to provide the desired muzzle control. FIG. 12A is a detailed view of the adjustment buckle 240. The size of the opening 235 of the muzzle loop 234 may be adjusted by means of the Ladderloc™ adjustment buckle 240 installed on the muzzle loop 234.

Figure 13:
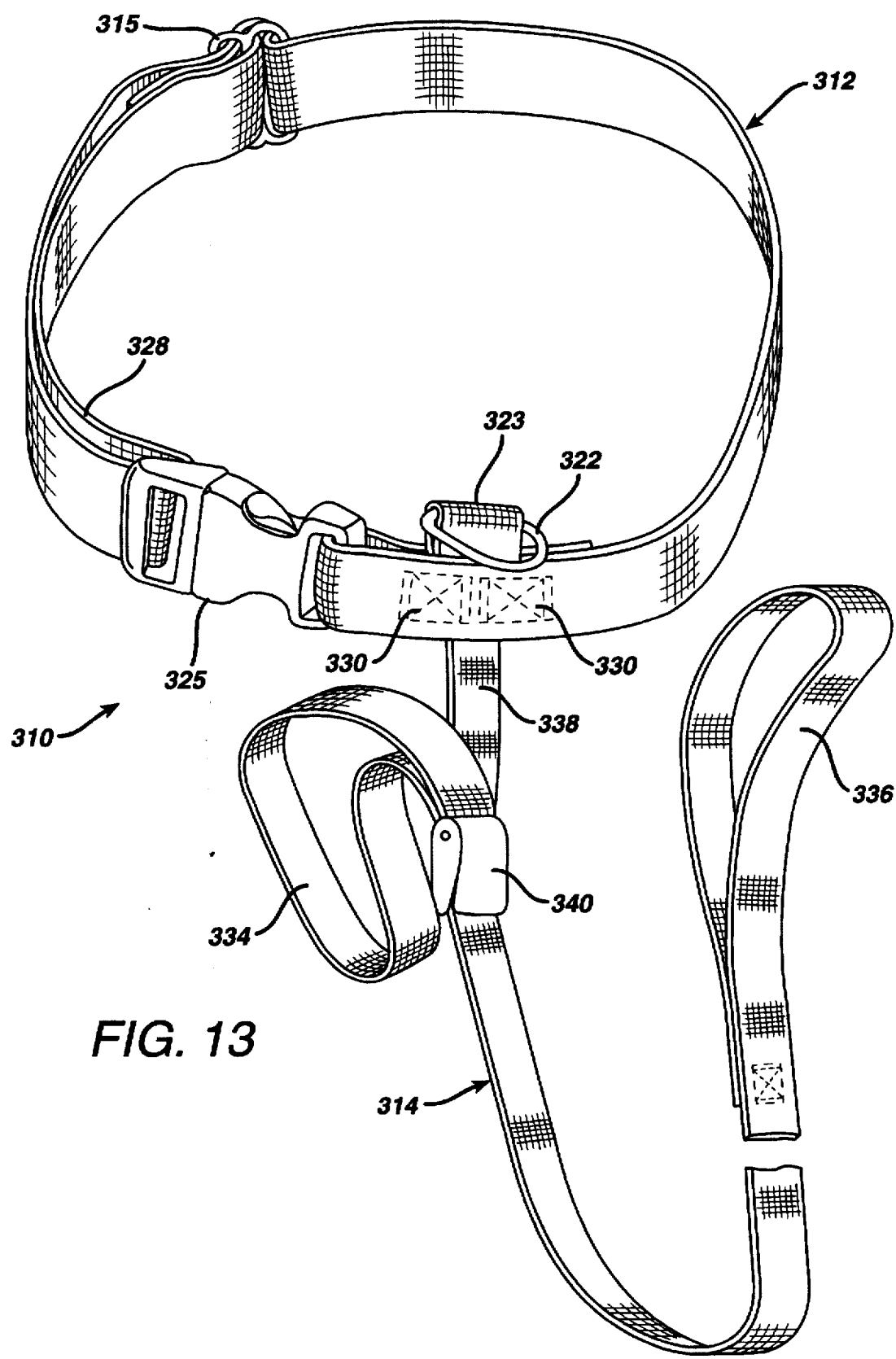
FIG. 13 is a perspective view of an integrated leash and collar combination.

FIG. 13 illustrates yet another simplified muzzle and leash combination 310 comprised of an integrated leash portion 314 and collar portion 312. The collar portion 312 includes an overlapping section 328 and a tri-slide ring 315 to permit adjustment of the size of the collar to the dog's neck. The collar portion 312 may also include a releasable locking device as the TUFF LOCK™ device 325 to facilitate installation and removal of the collar portion 312 from the neck of the dog. The muzzle ring 322 (shown as a D-shaped ring) is attached by a fabric loop 323 at the top of the collar.

The leash portion 314 includes a handle section 336 on one end thereof. The other end of the leash portion 314 includes the muzzle loop 334 and cam buckle 340 (as described in previous embodiments. In this embodiment, the leash portion 314 is integrally attached to the collar portion 312 (i.e., it is non-detachable). The leash portion 314 includes a strap section 338 which is attached to the collar portion 312. The strap section 338 may also serve as the fabric loop 323, with both elements being conveniently attached to the collar by stitching 330 in a single fabrication step.

Thus, embodiments of a dog leash and collar combination have been shown and described. Though certain examples and advantages have been disclosed, further advantages and modifications may become obvious to one skilled in the art from the disclosures herein. The invention therefore is not to be limited except in the spirit of the claims that follow.

What is claimed is:

1. A leash and collar combination for a dog, comprising
  a collar portion including a muzzle ring attached thereto, the collar portion being securable around a neck of the dog;
  a leash portion having a first end attached to the collar portion, a second end including a handle portion, and a muzzle loop proximate the first end which is threadable through the muzzle ring and outwardly extendable therefrom for encircling a muzzle of the dog.

2. A leash and collar combination according to claim 1 wherein the leash portion is integrally attached to the collar portion.

3. A leash and collar combination according to claim 2 wherein the first end of the leash portion is integrally attached to the collar portion by stitching.

4. A leash and collar combination according to claim 1 wherein the leash portion includes a snap hook on the first end for removable attachment to the collar portion.

5. A leash and collar combination according to claim 1 wherein the collar portion comprises
  a main collar section having first collar end and second collar end,
  a first collar ring secured to the first collar end and a second collar ring secured to the second collar end,
  a tab section having a free end and a connected end, the connected end being secured to the first collar ring and the free end being threaded through the second collar ring, and
  a leash ring attached to the free end of the tab section.

6. A leash and collar combination according to claim 5 wherein the leash portion includes a snap hook on the first end for removable attachment to the leash ring.

7. A leash and collar combination according to claim 1 further comprising a locking device for adjustable setting and locking of the muzzle loop to a desired size.

8. A leash and collar combination according to claim 1 wherein the muzzle ring is attached to the collar portion along an edge of the collar portion.

9. A leash and collar combination for a dog comprising
  a collar portion including a muzzle ring and a leash ring, the collar portion being securable around a neck of the dog;
  a leash portion having a first end and a second end, the leash portion including (a) a connector attached to the first end for detachable connection to the leash ring and (b) a muzzle loop which is threadable through the muzzle ring and outwardly extendable therefrom for encircling a muzzle of the dog.

10. A leash and collar combination according to claim 9 wherein the leash portion is constructed and arranged such that upon detachment of the connector and removal of the muzzle loop from the dog's muzzle, the muzzle loop may be unthreaded through the muzzle ring, the leash portion with the muzzle loop is entirely removable from the collar portion.

11. A leash and collar combination according to claim 9 wherein the collar portion includes means for adjusting size of the collar portion to achieve a proper fit about the dog's neck.

12. A leash and collar combination according to claim 11 wherein the collar portion is sized to rest at a comfortable position low on the neck approaching shoulders of the dog.

13. A leash and collar combination according to claim 9 wherein the muzzle ring is pivotally attached in a position at a top edge of the collar portion parallel to the collar portion, and wherein the leash ring is pivotally attached to the collar portion perpendicularly thereto.

14. A leash and collar combination according to claim 9 wherein the muzzle ring comprises a D-shaped ring having a curved side and a straight side, the straight side of the D-ring being attached to the collar portion, and wherein the leash ring comprises a D-shaped ring having a curved side and a straight side, the straight side being attached to the collar portion.

15. A leash and collar combination according to claim 9 wherein the muzzle ring comprises a rectangular-shaped ring having two straight sides with one of the straight sides being attached to the collar portion.

16. A leash and collar combination according to claim 9 wherein the connector comprises a snap hook.

17. A leash and collar combination according to claim 9 wherein the collar portion comprises
  a main collar section having first collar end and second collar end,
  a first collar ring secured to the first collar end and a second collar ring secured to the second collar end,
  a tab section having a free end and a connected end, the connected end being secured to the first collar ring and the free end being threaded through the second collar ring,
  wherein the leash ring is attached to the free end of the tab section.

18. A leash and collar combination according to claim 9 wherein the muzzle ring is attached to the collar portion along an edge of the collar portion.

19. A leash and collar combination for a dog, comprising a collar portion including a muzzle ring and a leash ring, the collar portion being securable around a neck of the dog;

a leash portion having a first end and a second end, the leash portion including (a) a connector attached to the first end for detachable connection to the leash ring and (b) a muzzle loop which is threadable through the muzzle ring and outwardly extendable therefrom for encircling a muzzle of the dog;

a locking device for adjustable setting and locking of the muzzle loop to a desired size.

20. A leash and collar combination according to claim 19 wherein the locking device is selected from the group consisting of: buckles, clamps, slide rings.

21. A leash and collar combination for a dog, comprising a collar portion including a muzzle ring and a leash ring, the collar portion being securable around a neck of the dog;

a leash portion having a first end and a second end, the leash portion including (a) a connector attached to the first end for detachable connection to the leash ring and (b) a muzzle loop which is threadable through the muzzle ring and outwardly extendable therefrom for encircling a muzzle of the dog;

a buckle secured on the leash portion for permitting adjustment and locking of the muzzle loop to a desired size, the buckle being located on a leash side of the muzzle ring when the muzzle loop is in position encircling the muzzle of the dog.

22. A leash and collar combination for a dog, comprising a collar portion including a muzzle ring attached thereto, the collar portion being securable around a neck of the dog;

a leash portion having a first end attached to the collar portion, a second end including a handle portion, a muzzle loop proximate the first end which is threadable through the muzzle ring and outwardly extendable therefrom for encircling a muzzle of the dog, and a locking device for adjustable setting and locking of the muzzle loop to a desired size.

* * * * *